F. T. KOEHN.
SUPPORTING ATTACHMENT FOR MOTOR CYCLES.
APPLICATION FILED NOV. 18, 1911.
1,052,348.
Patented Feb. 4, 1913.
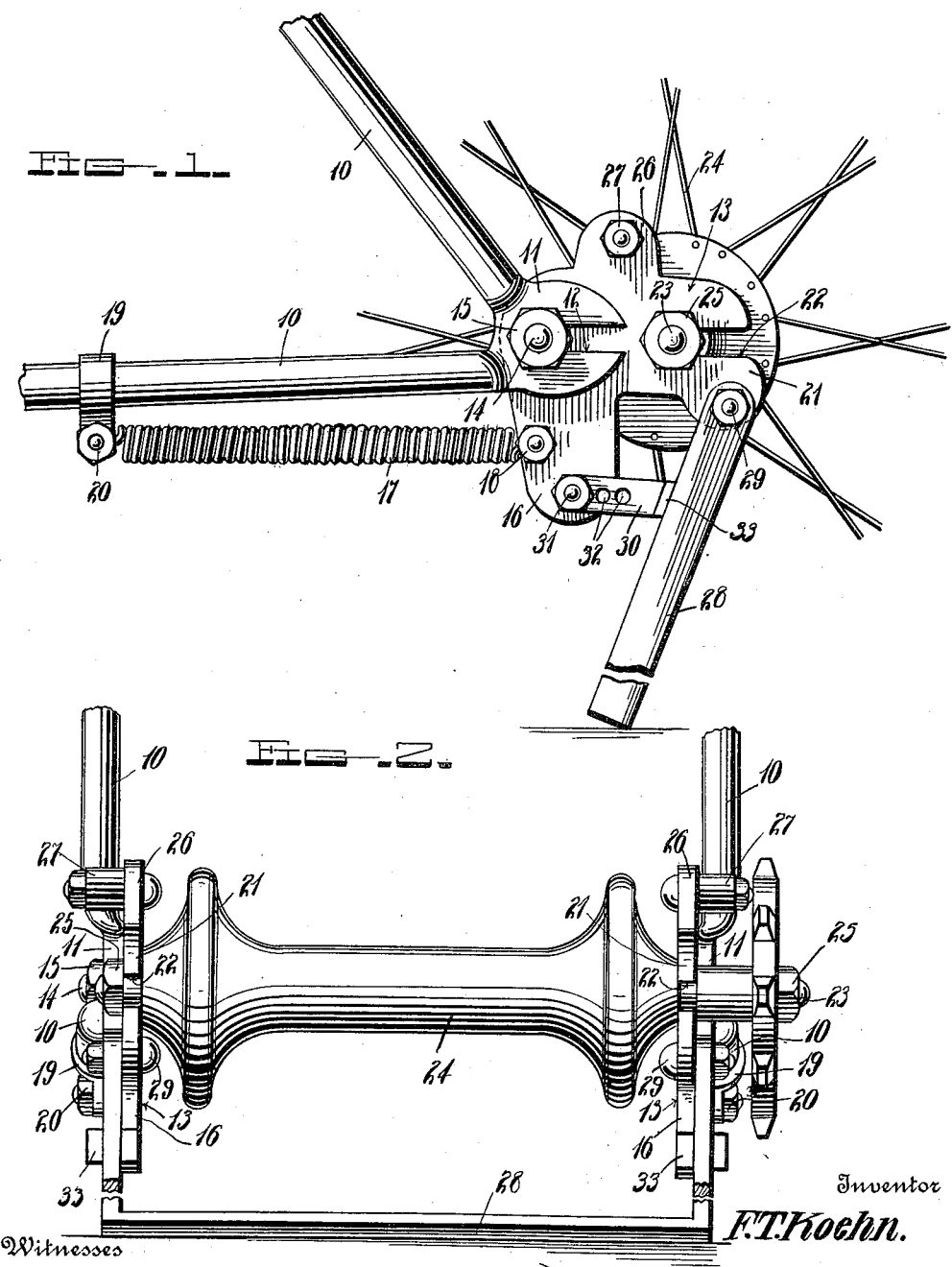

UNITED STATES PATENT OFFICE.

FRANK T. KOEHN, OF TAMPA, KANSAS.

SUPPORTING ATTACHMENT FOR MOTOR-CYCLES.

1,052,348. Specification of Letters Patent. Patented Feb. 4, 1913.

Application filed November 18, 1911. Serial No. 660,972.

*To all whom it may concern:*

Be it known that I, FRANK T. KOEHN, a citizen of the United States, residing at Tampa, in the county of Marion, State of Kansas, have invented certain new and useful Improvements in Supporting Attachments for Motor-Cycles; and I do hereby declare the following to be a full, clear, and exact description of the invention, such as will enable others skilled in the art to which it appertains to make and use the same.

This invention relates to an attachment for motorcycles and more particularly to means for resiliently supporting the frame upon the wheels thereof whereby shocks incident to travel over uneven road surfaces are thoroughly absorbed thereby reducing the shock upon the wheels and frame for increasing the enjoyment of riding.

Another object of the invention is to provide a novel form of resilient connection between the forks of the frame and axle of the wheel in combination with a stand for supporting the motorcycle or bicycle in a standing position and which is adjustable in an angular direction.

With these and other objects in view, the invention consists of certain other combinations and arrangements of parts as will be hereinafter more fully described and claimed, it being a still further object of the invention to provide a device which will not be likely to get out of working order.

In the drawings:—Figure 1 is a side elevation of a portion of a motorcycle frame showing my improved resilient connection and stand connected thereto. Fig. 2 is a rear elevation of the device.

Referring to the drawings in detail, there is shown a portion of a fork of a motorcycle or bicycle frame, the same being indicated by the numeral 10 and comprising the horizontal rear forks provided at their joined ends with enlargements 11 forming bearings and provided with entrance slots 12 of the usual construction and adapted in the ordinary use to receive the axle of the rear or drive wheel.

In carrying out the present invention, I provide a pair of substantially right angular plate members 13 in the form of bell crank levers which are pivotally supported within the slots 12 by a bolt 14 inwardly of the enlarged portions 11, said bolt having nuts 15 mounted on the ends thereof outwardly of said enlarged portions for retaining the bolt within the slots and permitting pivotal movement of the levers.

One arm 16 of each of the bell crank levers extends downwardly and intermediately of their lengths, coiled springs 17 of proper length and tension are connected as shown at 18 while the forward ends of the springs are connected to the lower ends of the clamps 19 engaging around the horizontal portions of the forks and secured thereto as shown at 20. The other arms 21 of the bell crank levers extend rearwardly and are provided with slots 22 for receiving an axle 23 of the rear or drive wheel 24 which is retained in position by nuts 25 engaged on said axle at its ends and thus during the travel of the vehicle any shocks or jars subjected to the rear wheel when the latter is under a load upon the frame will permit said frame to be lowered or permit upward movement of the axle 23 with the wheel to swing the arms 21 upwardly and draw the arms 16 rearwardly against the tension of the coiled springs 17 and thus absorb the jar and increase the life of the vehicle.

The arms 21 are provided with upwardly extending apertured ears 26 to which cushion members 27 are secured and adapted to engage the upper fork portions of the frame so as to form a further cushion should the jar be sufficient to move or pivot the levers to such extent. The usual form of U-shaped supporting stand 28 has its leg portions pivotally connected to the lower rear extremities of the arms 21 as shown at 29 and the lower extremity of each of the arms 16 has a buffer arm 30 adjustably connected thereto by means of set bolts 31 which are adapted to engage in a series of openings 32 in the arms, the rear ends of the latter being provided with cushion elements 33 for engagement with the side or leg portions of the frame 28 to limit the forward movement of the frame or stand while the adjustment permits proper movement thereof. It is of course understood that the stand 28 is adapted to be supported in a raised position when not in use, in the usual or any preferred manner.

I wish to have it understood that I may make such changes in the construction of the device as fairly fall within the scope of the appended claim and it is further submitted that the device under the statutes is protected for all desirable uses to which it may be put without departing from the spirit of the invention.

I claim:—

The combination with the rear fork member of a motorcycle frame; of angular levers pivoted between said forked portions, resilient connections between certain arms of the levers and the fork, a wheel rotatably journaled in the other arms, a supporting stand pivoted to the last mentioned arms and adjustable stop members carried by the first mentioned arms for engagement by the supporting stand.

In testimony whereof, I affix my signature, in presence of two witnesses.

FRANK T. KOEHN.

Witnesses:
F. J. PARRY,
ADAM YAUK.

Copies of this patent may be obtained for five cents each, by addressing the "Commissioner of Patents, Washington, D. C."